United States Patent [19]

Lamm et al.

[11] Patent Number: 4,624,725

[45] Date of Patent: Nov. 25, 1986

[54] TWO-COMPONENT ACRYLIC MODIFIED POLYESTER ADHESIVE

[75] Inventors: Foster P. Lamm, South Windsor; Roscoe A. Pike, Windsor, both of Conn.

[73] Assignee: United Technologies Corporation, Hartford, Conn.

[21] Appl. No.: 692,456

[22] Filed: Jan. 18, 1985

Related U.S. Application Data

[62] Division of Ser. No. 591,729, Mar. 21, 1984, abandoned.

[51] Int. Cl.$^4$ .................................................. B32B 7/00
[52] U.S. Cl. ..................................... 156/310; 523/500; 523/514; 524/906
[58] Field of Search ................ 156/310; 523/500, 514; 524/906; 525/17, 27

[56] References Cited

U.S. PATENT DOCUMENTS

| | | | |
|---|---|---|---|
| 2,928,804 | 3/1960 | Foster et al. | 156/310 |
| 3,591,438 | 7/1971 | Toback et al. | 156/310 |
| 3,660,532 | 5/1972 | Werner et al. | 515/17 |
| 3,853,827 | 12/1974 | Klatil et al. | 515/17 |
| 4,403,058 | 9/1983 | Dohi et al. | 524/906 |

Primary Examiner—Lewis T. Jacobs
Attorney, Agent, or Firm—Alan C. Cohen

[57] ABSTRACT

The present invention relates to a two-component acrylic modified polyester adhesive. Said adhesive comprising a first component having an acrylic modified polyester and about 0.1% to about 0.5% by weight of a peroxide, and a second component comprising an organometallic acid salt in a polymerizable organic monomer. In addition, a method of using said adhesive is disclosed.

1 Claim, No Drawings

TWO-COMPONENT ACRYLIC MODIFIED POLYESTER ADHESIVE

This is a division of application Ser. No. 591,729, filed on Mar. 21, 1984, now abandoned.

DESCRIPTION

1. Cross Reference to Related Application

This application relates to U.S. application Ser. No. 591,736, filed on even date herewith by Roscoe A. Pike and Foster P. Lamm for ACRYLIC MODIFIED POLYESTER ANAEROBIC ADHESIVE, now U.S. Pat. No. 4,524,176, issued June 18, 1985.

2. Technical Field

The technical field to which this invention pertains is anaerobic adhesives and in particular modified acrylic containing adhesives.

3. Background Art

Modified acrylic adhesive systems have achieved acceptance as substitutes for mechanical fastening methods. Fundamental to the performance of such adhesive systems is their ability to provide both the rigidity required for high tensile strength and the toughness and flexibility required for high peel and impact resistance. Initially, anaerobic adhesives were introduced as locking and sealing compounds. Although these adhesives were capable of improving the strength and reliability of threaded fasteners and sealing leaks they did not possess the flexibility and toughness of a true structural adhesive.

One approach to overcoming the inflexibility of the adhesive is to combine dimethacrylates and urethanes. The modified acrylics are normally solutions of mono-methacrylate monomers and polymeric rubbers. There are also systems available which are made using higher molecular weight mono-methacrylates, which impart greater flexibility to these adhesives. In general, however, both types of systems are two-part systems similar to epoxys. In these systems, one part consists of the polymer, monomer or initiator, while the other part contains the activator. All of these systems require mixing and measuring prior to their being applied to the structure to be bonded.

Therefore, what is required in this art is a two-component, modified acrylic adhesive which does not require any premixing or measuring prior to its application to the substrate to be bonded. In addition, such an adhesive should possess the properties of a true structural adhesive, such as good flexibility and toughness.

DISCLOSURE OF INVENTION

The present invention comprises an acrylic modified polyester, two-component adhesive and a method of making the same. The first component comprises an acrylic modified polyester which is the reaction product of a hydroxyl containing polyester and a glycidyl acrylate, and a peroxide. The second component comprises an organometallic acid salt dissolved in a polymerizable organic monomer.

Another aspect of the present invention comprises a method of using said two-component adhesive.

Other objects and advantages of the present invention will become more apparent from the following detailed description of the best mode.

BEST MODE FOR CARRYING OUT THE INVENTION

Any hydroxyl containing polyester which is in liquid form at temperatures below 50° C. or can be dissolved in an appropriate aprotic solvent such as dioxane, tetrahydrofuran, acetonitrile may be used to practice this invention. The polyester may contain aliphatic, aromatic, branched or straight chained groups with the presence of aromatic being preferred. In general, the hydroxyl containing polyester is formed by reacting a di-, tri-, or tetra-carboxylic acid or an anhydride with a polyhydric alcohol. Some typical carboxylic acids or esters which may be used are maleic acid, citraconic acid, itaconic acid, trimellitic acid, isophthalic acid, and di-methyl terephthalate. Some polyhydric alcohols which may be used are glycerol, ethylene glycol, diethylene glycol and 1,2-propane diol. The above cited reactants are merely exemplary and are not intended to be limiting. Other conventional carboxylic acids and their anhydrides as well as other polyhidric alcohols may be used. Typically, liquid hydroxyl containing polyesters may be prepared by reacting a carboxylic acid or anhydride with a polyhydric alcohol using any conventional technique. One such technique may be found in *Methods of Polymer Chemistry* by W. R. Sorenson and T. W. Campbell, second edition, published by Interscience 1968, the disclosure of which is incorporated by reference. The polyester should be formulated such that the hydroxyl equivalent weight is about 150 to about 250 with a preferred range of about 195 to about 200. An important feature that underlies the hydroxyl equivalents present in the polyester is that they should be sufficient in number to react with the epoxy groups present in the acrylate to produce the necessary adhesive properties. In general, the higher the hydroxyl equivalents, the greater the number of the epoxy-hydroxyl reactions and the stronger the resulting adhesive will be. In addition, the higher the number of epoxy-hydroxyl reactions, the less flexible will be the resulting adhesive. The variation of the epoxy to hydroxyl ratio is most easily controlled by varying the ratio of the di-, tri- and tetracarboxylic acids to each other. Typically, the polyesters prepared having these parameters will have a viscosity at room temperature of about 5,000 cps to about 50,000 cps, with a viscosity of 6,000 to 10,000 cps being preferred.

The glycidyl acrylates which are used to react with the polyester in preparing these adhesives, should be soluble in the polyester and may be aromatic, aliphatic, straight-chained or branched. The preferred acrylates are glycidyl methacrylate, and glycidyl acrylate and their preparation is known to those skilled in the art (i.e. U.S. Pat. No. 2,524,432 the disclosure of which is incorporated by reference herein). Other glycidyl acrylates which may be used are listed in Table I below:

TABLE I 2-phenyl, glycidyl acrylate
p-anisyl, glycidyl acrylate
o-chlorophenyl, glycidyl acrylate
p-cumyl, glycidyl acrylate The methacrylate derivatives of the above acrylates, may also be used.

Typically, the reaction between the hydroxyl containing polyester and the glycidyl acrylate is performed as follows. The liquid polyester is introduced into the reaction vessel with or without a solvent. The acrylate is then added to the polyester with stirring. The amount of glycidyl acrylate which is added to the polyester is typically such that the hydroxyl to glycidyl ratio is from about 1:1 to about 1:0.4 with 1:1 being preferred. In the case where the ratio is less than 1:1, the resulting adhesive will generally have greater flexibility but lower adhesive properties.

During these reactions, it is likely that some undesirable cross-linking of the vinyl groups present may occur and therefore an inhibitor such as hydroquinone, butylated hydroxy toluene (BHT) or butylated hydroxy analine (BHA) is added. The inhibitor should be added prior to the introduction of the acrylate and in sufficient amounts to prevent such cross-linking from occurring. Typically, these are added in amounts of about 0.01% by weight to about 2.0% by weight with about 0.1% by weight being preferred. The percent by weight as recited above is in relationship to the total weight of the reactants.

Additionally, these reactions may require the presence of a catalyst to cause the reaction to take place within a reasonable time. Two such catalysts which have been determined to work well are sulfuric acid and boron trifluoride etherate. Typically, these catalysts are present in concentrations which range from about 0.001% to about 2.0% by weight of the total reactants present. Other catalysts which may be used are $AlCl_3$ and $SnCl_4$.

Subsequent to the addition of the catalyst and inhibitor and with constant stirring at temperatures ranging from about 60° F. (15.5° C.) to about 90° F. (32.2° C.), the addition reaction is initiated. Typically, these reactions are exothermic and the temperature of the reactants will rise to about 50° C. There is no temperature limitation to these reactions except that the temperature should not be allowed to rise above the polymerization temperature of the glycidyl acrylate. This polymerization temperature will also be dependent on the quantity of the crosslinking inhibitor. Typically, the temperature should not exceed about 75° C. It should be pointed out that since the resulting reaction product is an anaerobic adhesive, it is required that sufficient oxygen be present during the reaction to prevent the adhesive from curing in the reaction vessel. Typically, this is in amounts ranging from about 5% to about 20% or more by volume of oxygen in the reaction flask. The reaction of the acrylate with the polyester is allowed to continue until little or no free acrylate is present. In the case of the components having an epoxy to —OH ratio of 1:1, this would mean substantially all of the hydroxyl groups will be reacted. It is not necessary, and it may be desirable to react fewer of the hydroxyl groups, i.e. 25%, 50% or 75%, in these situations, the resulting product will be a more flexible adhesive but one having diminished adhesive properties. Generally the reaction time is from about 1 to about 16 hours depending on the extent of the %—OH reacted. The higher the percentage of the —OH reacted, the longer the reaction time. The progress of the reaction and the % of the hydroxyl groups reacted may be followed using conventional infrared or chromatographic techniques.

It has been found that in those cases where the reaction takes place in the presence of an acid catalyst, i.e. sulfuric acid, or boron trifluoride-etherate, the resulting product must be neutralized before it will react as an adhesive. It is believed that the acid acts as an inhibitor to the polymerization of the acrylate groups during curing, which are introduced during the reaction of the glycidyl acrylates with the polyester. Although it is believed that any neutralizing agent may be used, for example inorganic amines, sodium hydroxide, ammonium hydroxide, or carbonates, the preferred materials are alumina and calcium carbonate. These neutralizing agents are added in sufficient quantities to raise the pH of the modified polyester to about a pH of 7 or higher.

In addition to acting as neutralizing agents, it has been found that in the case of alumina and calcium carbonate, these materials also act as fillers and are useful in controlling the final viscosity of the adhesive. In many instances, the viscosity of the resulting adhesive will be so low that it may be difficult to maintain it in its preferred position while curing. Therefore, a filler material may be added to increase the viscosity. Such fillers as mentioned, as well as others, and their use in this manner, are known and do not constitute part of this invention. Typically, these fillers will be added in amounts from about 10% by weight to about 60% by weight with about 40% to about 50% preferred.

To the above described modified polyester and optional filler or neutralizing agent, is added an organic peroxide or hydroperoxide, i.e. dicumyl peroxide, dibenzoyl peroxide, methyl, ethyl ketone peroxide, gamma, gamma-bis(T-butyl peroxy) diisopropyl benzene and cumyl hydroperoxide, etc. These peroxides and hydroperoxides are added to the modified polyester with stirring in concentrations of about 0.1% to about 0.5% by weight of the polyester, and stirring continues until the mixture is homogenous. Typically, this addition of the peroxide takes place at temperatures about 15° C. to about 35° C., or higher with about 25° C. preferred. The peroxide addition should also take place with sufficient oxygen present to prevent premature cross-linking of the adhesive. Typically, this is in amounts from about 5% to about 20% by volume of oxygen in the atmosphere surrounding the reactants.

The above described acrylic modified polyester, peroxide, optional fillers and neutralizing agents comprise the first component for the two-component adhesives of the present invention.

The second component of this adhesive system comprises an organometallic acid salt dissolved in an organic polymerized monomer.

The organometallic acid salts may be any of the typical agents used to activate the peroxide to form free radicals and accelerate the cross-linking of the modified polyester in component one, thus causing it to cure. Typically, these agents comprise organic salts of cobalt or vanadium in the form of cobalt naphthenate, vanadium dodecanoate, etc. Other agents which may work are acid salts of chromium, thallium, and rare earth metals, i.e. lanthanum, cerium, etc. or combinations of rare earth metals. However, the preferred agent is cobalt naphthenate.

The agent is dissolved in an acrylic monomer which is compatible with the modified polyester, and the agent. A list of typical monomers which may be used is in Table II. The particular monomer which is chosen may have a dual purpose. First it will allow for easier and more uniform application of the agent to the substrate. Secondly, it may be selected on the basis of the effect it will have on the properties of the final adhesive when cured. As the reaction takes place, the monomer reacts with the polyester by cross-linking the monomers unsaturated bonds with the acrylated polyester. Therefore, the greater the unsaturation in the monomer, the more cross-linking takes place and the less flexible the final adhesive. Typically, about 0.1% to about 0.5% by weight of the polyester, of the organometallic salt is added to the monomer while stirring at temperatures from about 15° C. to about 35° C. or higher.

TABLE II

Triallyl cyanurate
Trimethylol propane triacrylate
1,6-hexane diol diacrylate
2-ethyl hexyl acrylate
Ethylene glycol dimethacrylate
Pentaerythritrol tetramethacrylate
Epoxylated bisphenol A dimethacrylate
Isopropyl methacrylate The stirring continues until the salt is dissolved. This addition does not require an anaerobic atmosphere as does component one.

When using the adhesive to bond two surfaces together, the procedure is as follows:

Apply a thin substantially uniform film, typically about 0.1 mil to about 10 mils of the first component to the first surface. Then apply a thin, substantially uniform film, typically about 0.1 mil to about 2 mils, of the second component to the second surface. Contact the first surface with second surface and maintain contact until the adhesive is cured. Typically, the adhesive will cure in about ½ hour to about 2 hours at temperatures from about 20° C. to about 30° C. Generally, the adhesive described herein is cured at room temperatures, however, they may also be heated to higher temperatures of about 75°–150° C. to speed up the curing time.

Although these temperatures are not critical, it should be noted that as the temperature increases, the viscosity drops and there is a danger that the adhesive will flow away from the bonding surface and the resulting bond will be less than optimum.

A typical two-component adhesive has been made using a polyester adduct formed from dimethyl terephthalate, isophthalic acid, trimellitic acid, and diethylene-glycol or ethylene glycol using a butyl titinate catalyst.

Hydroxyl containing polyester was prepared using the following reactants:

| Material | % by weight |
|---|---|
| Tetra-butyl titinate | 0.10 |
| Dimethyl terephthalate | 29.25 |
| Isophthalic anhydride | 8.34 |
| Trimellitic anhydride | 9.65 |
| Diethylene glycol | 52.66 |

This polyester was prepared using conventional techniques wherein the reaction proceeded at temperatures of from about 93° C. to about 135° C.

Of the above-described hydroxyl containing polyester, 39.4 grams were placed in a 500 cc three-necked flask equipped with a mechanical stirrer and a thermometer. Then 0.01 gram of a hydroquinone was added and mixed thoroughly with the polyester. While stirring continued, 28.4 grams of glycidyl methacrylate (available from Polysciences Inc., Warrington, PA, or Alcolac Inc., Baltimore, MD) was added. The mixture was stirred and 0.6 gram of concentrated sulfuric acid was added. The stirring continued and an exothermic reaction occurred raising the temperature from about 25° C. to about 75° C. and remained there during the course of the reaction. The reaction was allowed to continue for approximately eight hours (until the polyester was about 100% acrylated). The resultant modified polyester had a viscosity of 130,000 cps at 70° C.

The resulting prepolymer was then mixed with about 50% by weight of aluminum oxide, and about 0.2% of methyl ethyl ketone peroxide and mixed till homogenous. This homogenous mixture comprised component one.

The second component comprised mixing about 0.5% of cobalt naphthenate in trimethylol propane triacrylate until homogenous, at room temperature, about 20° C. to about 25° C.

The resulting adhesive system was then tested for torque strength by applying a film about 1 mil in thickness to the threads of a nut and applying component two, to the threads of a screw to a thickness of about 0.2 mil. The nut was then threaded onto the screw and the adhesive allowed to cure for about 120 minutes at 25° C. The torque required to break the bond was then determined. The results were that the bond had a torque strength of 55 psi.

Other systems which were prepared using the same prepolymer, polyester and acrylate with different peroxides and organometallics are shown in Table III along with their torque strengths.

The adhesives of the present invention offer a number of advantages to those of the prior art. First, these adhesives are tougher, and are moisture resistant. Second, the adhesive may be manufactured to have varying physical properties, i.e. greater or lesser flexibility, by modifying the polyester or acrylate which is used in the system.

TABLE III

| Component 1 | Component 2 | Torque inch/ pounds |
|---|---|---|
| Polyester[a] + 50 w/o Al$_2$O$_3$ + 0.2 w/o cumyl hydroperoxide | 10 w/o trimethylolpropane triacrylate/ vanadium dodeconate | 15 |
| Polyester[a] + 50 w/o Al$_2$O$_3$ + 0.2 w/o cumyl hydroperoxide | 10 w/o trimethylolpropane triacrylate/ 0.5 w/o rare earth octoate | 5 |
| Polyester[a] + 50 w/o Al$_2$O$_3$ + MEK peroxide | 10 w/o trimethylolpropane triacrylate/ cobalt naphthenate | 55 |
| Polyester[b] + 50 w/o Al$_2$O$_3$ + 0.2 w/o cumyl hydroperoxide | 10 w/o trimethylolpropane triacrylate/ cobalt naphthenate | 20 |

[a]Polyester adduct using sulfuric acid catalyst.
[b]Polyester adduct using BF$_3$ etherate catalyst.

Thirdly, these adhesives are simple to use and require no mixing prior to application onto the substrate to be bonded.

Fourth, such adhesives offer a good structural adhesive which may be cured at room temperature in a relatively short time frame.

It should be understood that the invention is not limited to the particular embodiments shown and described herein, but that various changes and modifications may be made without departing from the spirit and scope of this novel concept as defined by the following claims.

We claim:

1. A method of bonding at least two articles together comprising:
preparing a first component having an acrylic modified polyester component, which is a reaction product of a glycidyl acrylate and a hydroxyl containing polyester, with about 0.1% to about 0.5% by weight of a peroxide, preparing a second component comprising a polymerizable organic monomer containing about 0.1% to about 0.5% by weight of an organometallic acid salt, applying said first component to the surface of a first article, applying said second component to the surface of a second article, and placing said first coated surface in contact with said second coated surface and maintaining contact until the adhesive cures.

* * * * *